United States Patent

[11] 3,608,721

| [72] | Inventor | Edwin B. Lopker<br>Fort Lauderdale, Fla. |
|------|----------|------------------------------------------|
| [21] | Appl. No. | 806,087 |
| [22] | Filed | Mar. 11, 1969 |
| [45] | Patented | Sept. 28, 1971 |
| [73] | Assignee | Pullman Incorporated<br>Chicago, Ill. |

[54] METHOD FOR FILTRATION OF SLURRIES
4 Claims, 4 Drawing Figs.

[52] U.S. Cl. .................................................. 210/66,
                                                         210/216
[51] Int. Cl. .................................................. B01d 25/28
[50] Field of Search .......................................... 210/66, 67,
                                                68, 216, 219, 384, 400–404

[56] References Cited
UNITED STATES PATENTS

| 820,560 | 5/1906 | Evans | 210/216 X |
| 1,865,061 | 6/1932 | Grob | 210/67 |
| 2,796,991 | 6/1957 | Nyquist | 210/384 |
| 2,937,069 | 5/1960 | Zoellner | 210/67 X |

*Primary Examiner*—Samih N. Zaharna
*Attorney*—John C. Quinlan

ABSTRACT: This invention concerns a process and apparatus for filtering slurries and efficiently washing the filter cake. More specifically, the invention provides for mechanically raking the surface of the filter cake to loosen particles therefrom. The loosened particles are entrained by a wash liquid or other fluid applied subsequent to the raking step; the entrained particles tend to occlude cracks in the filter cake, thereby eliminating preferential fluid flow through such cracks.

PATENTED SEP 28 1971 3,608,721
SHEET 1 OF 2
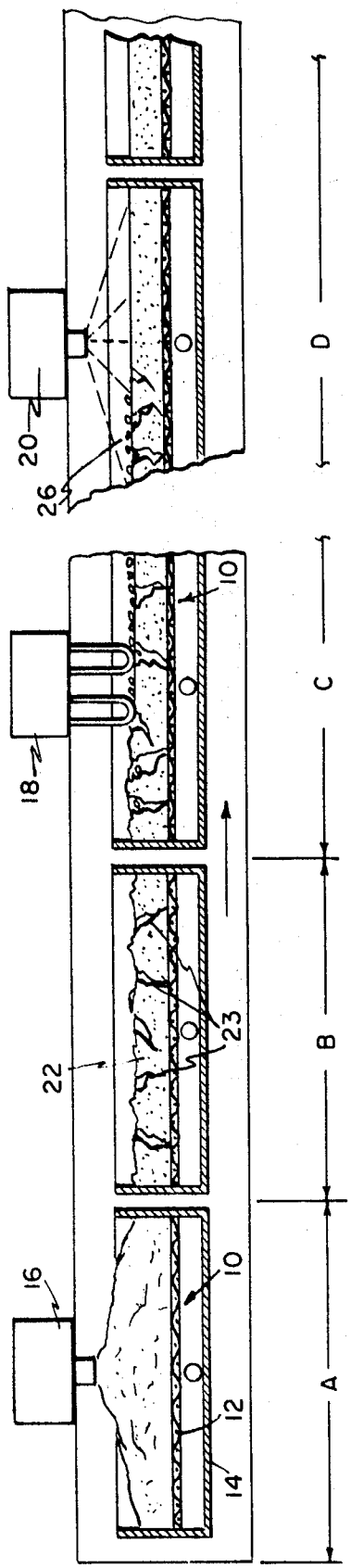
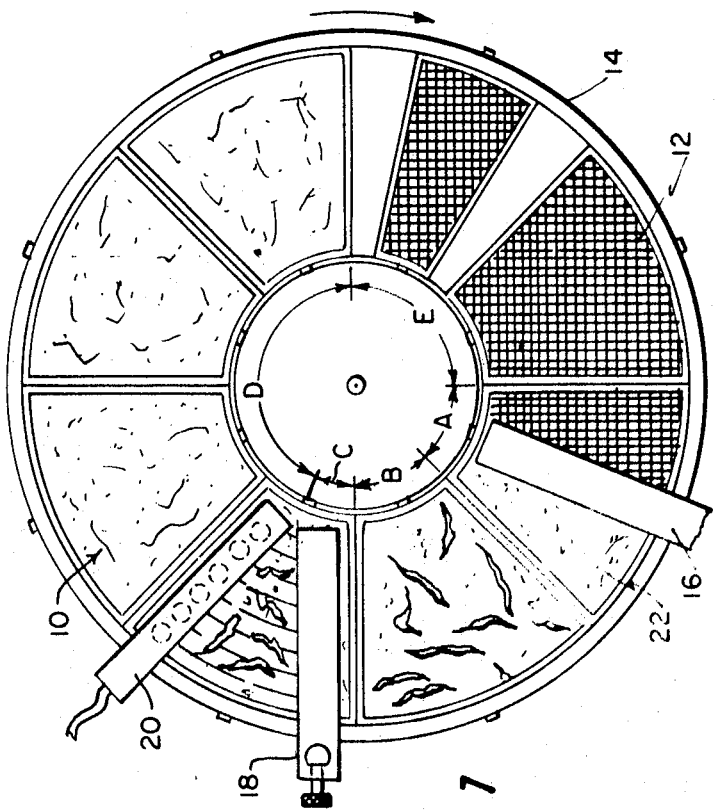
EDWIN B. LOPKER
INVENTOR.
BY
Victor E. Libert
AGENT

EDWIN B. LOPKER
INVENTOR.

BY Victor E. Gilbert
AGENT

METHOD FOR FILTRATION OF SLURRIES

BACKGROUND OF THE INVENTION

Filtration is a widely used process for the separation of the solid and liquid components of slurries. As used herein, slurry or slurries means any mixture of at least one or more liquids and at least one or more solids. The present invention relates to improvements in pressure or vacuum filters wherein filtration is accomplished by imposing a differential pressure across a filter medium onto which a slurry is deposited. The differential pressure tends to drive the liquid through the apertures of the filter medium leaving the solids entrapped thereon where they accumulate to form a filter cake, which is then removed from the filter medium. Usually, the filter medium is mounted on a rotating drum or circular bed or travelling belt so that the slurry is continuously applied to the filter medium at a given point and means to remove accumulated cake is located at another point to continuously remove the cake.

Frequently, a substantially complete separation of the liquid portion of the slurry (hereinafter referred to as the filtrate) from the solid portion is required. This may be because the solid portion of the slurry is a product which must be recovered substantially free of contamination by the filtrate, or because the filtrate itself is a valuable product. An example of the latter situation is the production of phosphoric acid by the so-called wet process wherein phosphate rock and sulfuric acid react to form a slurry of phosphoric acid solution (liquid) and calcium sulfate (solid), which slurry is filtered. Retention of the valuable phosphoric acid filtrate in the nearly worthless calcium sulfate filter cake must be minimized to assure an economic process. Accordingly, the filter cake is washed with water to recover the retained phosphoric acid therefrom.

For economic reasons, an inexpensive wash fluid, such as water, is preferred if otherwise suitable and the washing step is usually arranged so as to obtain maximum recovery of filtrate with minimum dilution thereof by the wash fluid.

Recovery of filtrate from the cake by the wash fluid proceeds in two well defined stages. The first stage is termed displacement washing and comprises physical displacement by the wash fluid of the filtrate retained in the cake. The effluent liquid collected during this stage of operation is, ideally, pure filtrate, free of any substantial dilution by the wash fluid. Under favorable conditions, as much as 90 percent of the filtrate retained in the cake may be recovered by displacement. The second stage may be termed the leaching stage and is characterized by a constantly increasing dilution of the effluent liquid until ultimately the effluent is essentially free of filtrate and is pure wash fluid. In practice, where the filtrate has substantial value, the collection of effluent liquid during the washing step is terminated at some point in the leaching stage, said point being dependent upon factors such as the value of the filtrate and the ease of separation of the filtrate from the wash fluid. If a filter cake substantially free of filtrate is required, the leaching stage is continued until the desired degree of filtrate removal is attained and the dilute effluent is discarded or may be retained, depending on the value of the wash fluid.

Successful washing of the filter cake is dependent upon the existence of uniform resistance to fluid through the cake. If the cake cracks, the cracks offer a lower resistance to fluid flow than does the body of the filter cake; some of the wash fluid subsequently applied will preferentially flow through the cracks and bypass the body of the filter cake. This phenomenon, hereafter called channelling, will prevent the collection of undiluted filtrate even in the displacement stage of washing, because the wash fluid will run directly through the cracks, mix with the dilute filtrate displaced from the body of the cake. Further, since wash fluid which runs through the cracks bypasses the filter cake, such wash fluid is ineffectual in removing filtrate from the cake and, if the filtrate is to be recovered, additional quantities of wash fluid must be used. Thus, channelling frustrates two main objectives of washing in that firstly, it precludes obtaining a substantially undiluted filtrate and secondly, impedes the leaching of retained filtrate out of the filter cake.

In practice, the physical characteristics of most filter cakes are of such a nature that the cake shrinks as filtrate is removed and cracking occurs. Sometimes the cracks are so fine as to be invisible to the unaided eye, and sometimes the cracks are quite large. The former is often the case, for example in the production of phosphoric acid wherein phosphoric acid filtrate must be separated from solid calcium sulfate. Upon drying, the calcium sulfate, while appearing uniform to the unaided eye, is actually interlaced with a network of fine cracks. The preferential flow of wash fluid through the cracks results in dilution of the recovered phosphoric acid filtrate and incomplete recovery of the filtrate from the cake, resulting in a considerable economic loss.

When the retained filtrate is of little value and the only object of the washing step is to secure cake free of contamination by the filtrate, prior art processes, to avoid the problems of wash fluid channelling, teach application of the wash fluid at a high enough velocity to break up the cake and form a new slurry of wash fluid, filtrate and solids. This slurry is then applied to the filter medium and refiltered. In this way, the concentration of filtrate in the liquid retained by the cake is substantially diluted. However, to obtain a more complete separation of filtrate from the cake, many such washing and refiltering steps are required, each producing a cake-retained liquid which progressively becomes more dilute in filtrate. Such a procedure is not only mechanically difficult and time consuming, but requires large quantities of wash water and yields a dilute filtrate.

A second prior art method used to obviate the channeling problem is applicable to rotary drum filters wherein the filter medium is stretched across a rotating drum which is continuously rotated through a slurry application zone, a filtering zone, a washing zone and a cake removal zone. This prior art method provides means to compress the cake as it passes from the filtering zone to the washing zone. Such means generally comprise an endless belt forced against the cake by means of rollers and driven by friction with the cake so that no slip occurs. Wash fluid is applied either after, or through, the belt. This method requires a mechanically complex and expensive apparatus which is not economically justifiable for most applications.

SUMMARY OF THE INVENTION

Accordingly, an object of the invention is to overcome the shortcomings of the prior art by providing a filtration method which equalizes resistance to fluid flow throughout the filter cake by continuously eliminating or repairing cracks formed in the cake.

Another object of the invention is to provide a novel efficient filtration method which yields a substantially undiluted filtrate and a filter cake which is substantially free of filtrate.

Accordingly, these objectives are accomplished by the process of applying a slurry to a porous filter medium, imposing a pressure differential across the filter medium, either by induced or natural fluid head, so that the liquid portion of the slurry tends to pass through the filter medium as the filtrate and the solid portion of the slurry tends to form a cake thereon, and loosening particles of the filter cake from the surface of the cake so that a fluid applied to the cake thereafter, as, for example, a washing fluid, will entrain the loosened particles. Since the applied fluid will preferentially flow through any cracks which may exist in the cake, the entrained particles are carried by the fluid into such cracks and are deposited therein. The cracks are thus rapidly occluded by the entrained particles. Consequently, the resistance to flow throughout the filter cake tends to become substantially uniform resulting in an even distribution of the flow of fluid through the entire body of the filter cake.

The loosening of surface particles may be accomplished by suitable means adapted to shear or abrade particles from the surface of the filter cake. The abrading or shearing means are adjustable so that in operation, the surface of the abrading element can be positioned to contact the surface of the filter cake. The shearing or abrasive action is supplied by relative motion between the abrading element and the filter cake. In the usual case (as with a rotary drum filter or a table filter) the cake is formed on a rotating filter medium. Thus, the required relative motion is realized by affixing the abrading element to a stationary supporting member of the filter assembly. On the other hand, when used with stationary filter media such as leaf filters, the abrading element may be supplied with means to move the element across the cake surface.

A preferred embodiment of an abrading means is a wire rake, containing hairpin-shaped wire teeth. The rake, moving relative to the cake, scores or furrows the surface of the cake, loosening particles so that they may subsequently be entrained by a fluid.

Whether stationary or moving means are employed for abrading the surface of the filter cake, the abrading means are adjustably supported so that the abrading action brought to bear on the filter cake may be adjusted by adjusting the support means.

BRIEF DESCRIPTION OF THE DRAWINGS

The invention may be more clearly illustrated by the accompanying drawings.

FIG. 1 is a plan view of a horizontal or table filter showing a preferred embodiment of the invention.

FIG. 2 is a schematic, developed view of segments of the filter of FIG. 1.

DESCRIPTION OF THE PREFERRED EMBODIMENTS

Figure 3:
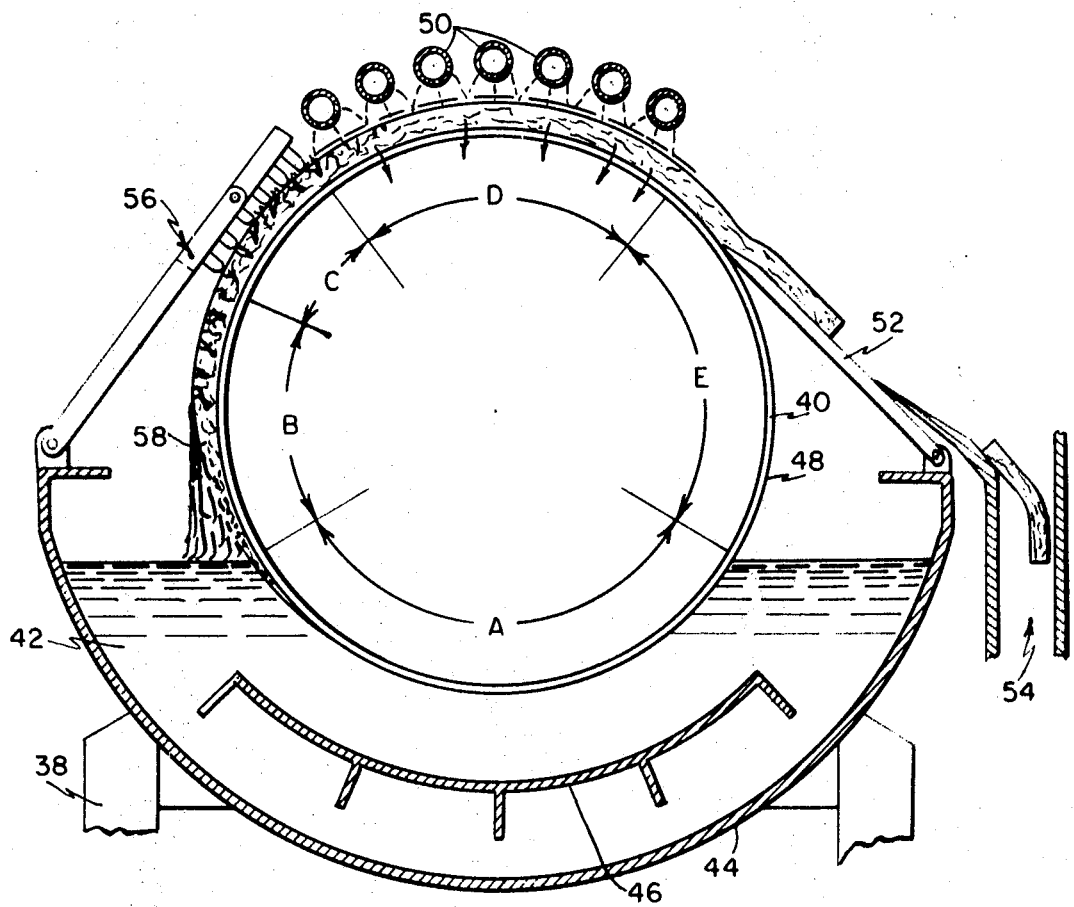
FIG. 3 is an end view of a rotary drum filter showing a preferred embodiment of the invention.

FIGS. 1 and 2, respectively, plan and schematic, developed views of a horizontal or table filter typical of those commonly used in the production of the phosphoric acid and phosphates. The filter comprises a plurality of horizontal cells 10 each having a filter medium 12 stretched across its surface and all held in a rotary frame 14. Additionally, a slurry feed distributor 16, an adjustable wire rake 18 and a wash fluid distributor 20, are provided. Means (not shown in the drawing) are provided to apply a differential pressure across the filter medium. Likewise, means for collecting the filtrate and means for rotating the frame, all of which are well known in the art of filtering, are not shown in the drawing for the sake of simplicity.

In operation, the frame 14 rotates in a horizontal plane. As each cell passes through the sector shown schematically as zone A, a coating of slurry is applied by the slurry distributor 16, to the filter medium 12. A pressure differential is imposed across the filter medium as the cell rotates into zone B. The major portion of the liquid in the coating is passed, under the influence of this pressure differential, through the building filter cake 22 and is collected by means not shown. Although cracking of the cake may occur elsewhere, it is most likely to occur in zone B where the primary filtrate is removed, with attendant shrinking. The cell now rotates into zone C, where the newly formed cake which may contain cracks and crevices contacts the adjustable wire rake 18 whereby particles are sheared or abraded from the cake surface by the action of the rake 18. Rotating from zone C into zone D, the cell passes under the wash fluid distributor 20. Wash fluid, distributed on the filter cake surface, entrains the dislodged particles of filter cake and flow preferentially through the crevices and through the filter cake. The crevices are rapidly occluded by the entrained particles and the filtrate retained in the cake is displaced, the filtrate being collected by means not shown. Finally, the cell rotates into zone E. Here, the cell is turned upside down and deposits the now substantially filtrate free filter cake into collecting means. Again, the collecting means for the filter cake as well as the means to invert the rotating cell are omitted from the drawing for the sake of simplicity. With this type of filter the hairpin-shaped teeth may be advantageously secured to an elastomer flap to form the rake 18. This allows ready passage over the sides of the horizontal cells 10 as they pass the location of the rake mechanism.

FIG. 2 further illustrates the operation of a horizontal rotary filter in accordance with the invention. This figure shows a schematically enlarged, fragmented, developed view of portions of the filter shown in FIG. 1. FIG. 2 shows separately developed views of zones A, B, C, and D. As the filter frame horizontally rotates clockwise, the filter cake in any given cell will move, as viewed in FIG. 2, from left to right, that is, from zone A through zone D.

The filter cake 22, as shown schematically in FIG. 2, is far from uniform. When a differential pressure is applied in zone B and the coating on the filter medium begins to dry, the newly formed cake tends to shrink. Cracks and crevices 23 appear throughout the cake. As shown in FIG. 2, these faults in the cake appear to be both numerous and large. It is to be understood however, that the degree of cracking, the size of the cracks formed, and the ultimate effect of these cracks upon the washing efficiency are all functions of, among other factors, the nature of the mixture of liquids and solids to be separated, the magnitude of the differential pressure extended, and the period over which the differential pressure is imposed.

Again referring to FIG. 2, the cake passes from zone B to zone C. In zone C, the surface of the cake comes into contact with the wire rake. The abrading action of the rake wires against the cake surface tends to shear off particles from the cake surface. The cake next moves into zone D. In this zone, the wash fluid is applied to the surface of the cake. The sheared-off particles become entrained in the wash fluid 26 which then passes through the filter cake (usually under the influence of the imposed pressure differential which may be maintained in zone D), thence through the filter medium, thence through the cells 10 and into collecting means, not shown. A portion of the washing and entraining liquid flows preferentially through the cracks in the cake and the entrained particles are deposited therein. After only a small fraction of the total washing period, the deposition of dislodged particles has sufficiently occluded the cracks so as to render the flow resistance uniform through out the filter cake. When this occurs, the flow of wash fluid will be evenly distributed throughout the cake, resulting in a highly efficient recovery of filtrate. While only a small amount of wash fluid will bypass the cake during the early occluding stage of the wash cycle, it may be desirable to begin the collection of the filtrate only after the occlusion of cracks or crevices is completed.

It should be understood that the filtering method of this invention is applicable to any type of filter, the description of a horizontal rotary filter being a mere illustration. It will be obvious to one skilled in the art that the invention is applicable to any filtration process, whether in continuous or batch operation, which comprises passing a fluid over the filter cake.

FIG. 3, for example, further illustrates the subject invention as applied to a rotary drum filter. Referring to this figure, a structure 38 supports the filter assembly. A hollow, cylindrical drum 40 is partially submerged in a slurry 42 contained by a slurry pan 44. The mixture is kept substantially homogeneous by means of a mechanical agitator 46. A filter medium 48 is stretched around the drum 40. The filter is equipped with wash water spray heads 50 and a doctor blade 52. Filter cake is collected in a chute 54. An adjustable wire rake 56, used to loosen particles from the surface of the filter cake, is provided. Means (not shown in the drawing) are provided to apply a differential pressure across the filter medium. Likewise, means for collecting the primary liquid and the means for feeding the slurry pan 44, all of which are well known in the art of filtering, are not shown in the drawing for the sake of simplicity.

In operation, the drum 40 rotates about its longitudinal axis. The portion of the drum passing through the sector shown schematically as zone A, becomes coated with the slurry to be separated by means of a pressure differential imposed across the filter medium 48. The major portion of the liquid in the coating is passed, under the influence of this pressure differential, through the building filter cake 58 and is collected by means not shown. In a manner similar to that illustrated in FIG. 2, cracks appear in the filter cake in zone B as the newly formed cake shrinks upon drying. The newly formed cake passes from zone B to zone C and contacts the adjustable wire rake 56 whereby particles are sheared from the cake surface by the abrading action of the rake 56. Passing from zone C to zone D, the cake is subjected to a spray of washing fluid from spray headers 50. The wash fluid in zone D entrains the dislodged particles of filter cake and flows preferentially through the cracks as well as through the cake. The cracks are rapidly occluded by the entrained particles and the filtrate retained in the cake is displaced and collected, by means not shown. In zone E, the cake is removed from the filter medium by means of a doctor blade 52 and is collected in a chute 54.

Figure 4:
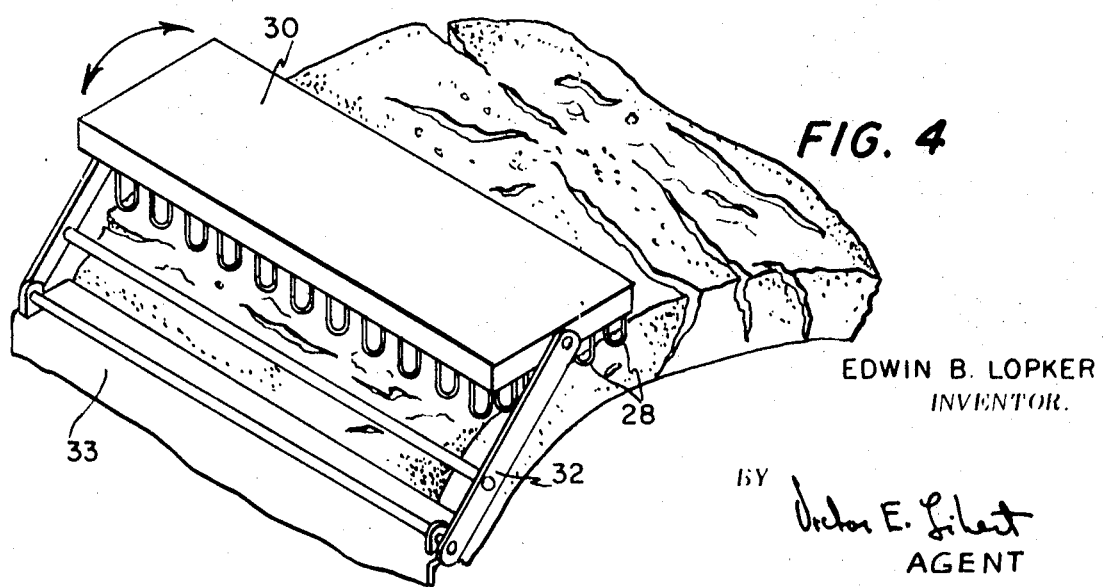
FIG. 4 is an isometric view of a preferred wire rake engaging the surface of the filter cake.

The wire rake, shown in FIG. 4 in a preferred configuration comprises a plurality of hairpin shaped wires 28 connected to a rake head 30 at the open end of the hairpin. The rake head is supported by a support member 32 and is cantilevered over the rotating filter by support means 33. Suitable adjusting means (not shown) may be used to position the rake head to apply the proper abrasive action to the cake surface. It is to be understood that the preferred configurations of filters and abrading means shown are merely exemplary and that any means or combination thereof is within the scope of the invention if it provides one or more abrading or shearing means in contact with a filter cake surface, so arranged that the abrading or shearing action loosens surface particles of the cake and means for applying a wash fluid to entrain the loosened particles of the cake.

For example, in addition to the rotating horizontal and rotary drum filters illustrated, stationary filter medium filters are known and used in which the steps of slurry application, pressure differential application and cake formation and washing are carried out in batchwise sequence. The present invention is equally applicable to such filters. For such stationary-filter-medium filters the rake or other abrading means used to loosen surface particles is moved along the surface of the stationary cake to provide the abrading action. To illustrate further, it will be apparent to those skilled in the art that although a single shearing or abrading means and corresponding fluid application will suffice for most cases, more than one shearing or abrading means in combination with corresponding fluid applications may be used on a single filter. The number and location of shearing or abrading means and fluid application will, of course, depend on the specific characteristics of the case involved.

What is claimed is:

1. A process of filtering a slurry comprising applying the slurry to a filter medium, passing liquid from the slurry through the filter medium, retaining the solid portion of the slurry on the filter medium to form thereon a filter cake the surface of which is substantially free of separated liquid and contains cracks, loosening particles from the surface of the cracked filter cake without breaking up the cake, applying a fluid to that portion of the cake containing the loosened particles so that the loosened particles are entrained in the fluid, and passing the fluid containing the entrained particles through said cake so that at least a portion of the entraining fluid passes through the cracks and deposits entrained particles within the cracks.

2. A process for filtering a slurry comprising applying the slurry to a porous filter medium, imposing a pressure differential across the medium so that the liquid from the slurry passes through the medium and the solid portion of the slurry forms a filter cake thereon the surface of which is substantially free of separated liquid and contains cracks, loosening particles from the surface of the filter cake without breaking up the cake, applying a fluid to the cake and entraining the loosened particles in the fluid, passing the fluid containing the entrained particles through said cake so that at least a portion of the entraining fluid passes through cracks existing in the cake and deposits the entrained particles within the cracks.

3. The process of claim 2 in which the entraining fluid applied to the cake is a wash fluid.

4. The process of claim 4 in which the slurry is a mixture containing calcium sulfate and phosphoric acid and the filter cake comprises substantially calcium sulfate.